United States Patent [19]

Herczog

[11] Patent Number: 4,593,341
[45] Date of Patent: Jun. 3, 1986

[54] TUBULAR CAPACITOR END TERMINATIONS

[75] Inventor: Andrew Herczog, Melbourne Beach, Fla.

[73] Assignee: Corning Glass Works, Corning, N.Y.

[21] Appl. No.: 736,814

[22] Filed: May 22, 1985

[51] Int. Cl.[4] .......................... H01G 1/14; H01G 4/28
[52] U.S. Cl. .................................... 361/310; 29/25.42; 361/321
[58] Field of Search ............... 29/25.42; 361/306, 310, 361/320, 321

[56] References Cited

U.S. PATENT DOCUMENTS

| | | | |
|---|---|---|---|
| 2,793,333 | 5/1957 | Ehlers | 361/321 X |
| 3,183,419 | 5/1965 | Rieth | 361/321 X |
| 3,246,215 | 4/1966 | Rieth | 29/25.42 X |
| 3,274,468 | 9/1966 | Rodriguez et al. | 361/321 |
| 4,109,292 | 8/1978 | Shibayama et al. | 361/306 X |
| 4,197,570 | 4/1980 | Kobayashi | 361/310 |
| 4,221,033 | 9/1980 | Kobayashi | 29/25.42 |

Primary Examiner—Donald A. Griffin
Attorney, Agent, or Firm—W. J. Simmons, Jr.

[57] ABSTRACT

A tubular capacitor is formed as follows. A ceramic tube comprising an outer ceramic cylinder and a plurality of radial walls is extruded. The extruded body may also include a second ceramic cylinder coaxial with the first. The one or more cylinders and the radial walls form a plurality of longitudinal passages. After the extrudate is fired and cut, the surfaces of the passages and the remaining surfaces of the cylinder or cylinders are metallized. Selected regions of metalization are removed to form discrete electrodes. The end terminations each comprise a base member from which there extends a plurality of prongs. Some of the prongs extend into the longitudinal passages, whereas others make contact with the outer surface of the outer cylinder and the inner surface of the inner cylinder.

11 Claims, 13 Drawing Figures

TUBULAR CAPACITOR END TERMINATIONS

CROSS-REFERENCE TO RELATED APPLICATION

The present invention is related to the invention disclosed in U.S. Patent Application Ser. No. 736,812 entitled "Tubular Capacitor and Method of Making" filed on May 22, 1985 (Bagley et al.).

BACKGROUND OF INVENTION

The present invention relates to tubular ceramic capacitors having metallized internal surfaces and having improved end terminations.

Coaxial capacitors have conventionally comprised a tube of ceramic material such as $BaTiO_3$, $SrTiO_3$ or the like. Inner and outer electrodes are formed on the tube so as to be electrically insulated from each other. End termination means are affixed to the ends of the tubular body to make electrical connection to the respective electrodes. Such capacitors and methods of making the same are taught in U.S. Pat. Nos. 4,109,292 and 4,197,570.

The volumetric efficiency of such capacitors can be increased by increasing the electrode surface area by means such as employing a more intricate cross-sectional configuration. For example, U.S. Pat. No. 3,274,468 teaches a cylindrical monolithic capacitor comprising a plurality of ceramic dielectric layers interleaved with conductive electrodes. The process of making such a capacitor is expensive since electrodes and additional dielectric layers must be applied in sequential steps. Also, all electrode layers except the last applied layer must be formed of noble metal in order to withstand the firing of subsequently applied dielectric layers.

Tubular capacitors are generally provided with cup-shaped electrode terminations that are applied over the ends thereof. Such capacitors exhibit low volumetric efficiency due to the loss of the end space under one of the cups thus restricting the useful part of the dielectric. Another problem is breakage of the fragile tube by pressing on the cups.

SUMMARY OF THE INVENTION

It is therefore an object of the present invention to provide an inexpensive, easily constructed, volumetrically efficient tubular capacitor. Another object is to provide an improved method of making volumetrically efficient tubular capacitors from extruded tubular structures. A further object is to provide improved end terminations which can be applied to various shapes of dielectric extrusions to form easily assembled cylindrical capacitors having improved voumetric efficiency.

Briefly, the present invention pertains to a tubular capacitor comprising an outer dielectric cylinder and a plurality of radial dielectric walls extending inwardly therefrom, the spaces between the outer cylinder and the radial walls forming longitudinal passages. Conductive electrodes are disposed on at least the walls that form the passages. First and second end termination means are situated at opposite ends of the capacitor. The first termination means comprises a base member from which there protrudes a plurality of longitudinally-extending prongs. The prongs extend into at least two of the passages and contact the electrodes therein. The second termination means contacts those of the electrodes that are not contacted by the first termination means.

At least that surface of the prongs that contacts the electrodes can be provided with a coating that conductively bonds the prongs to their respective electrodes.

The capacitor may comprise a second spaced dielectric cylinder coaxial with the first cylinder, in which case the radial walls extend between cylinders. The spaces between the cylinders and the radial walls constitute the passages. Additional conductive electrodes are provided on the outer surface of the outer cylinder and the inner surface of the inner cylinder. The prongs of the first termination means are electrically connected to the electrodes within all of the passages. The second termination means is connected to the additional electrodes.

The second termination means may also comprise a base member from which there protrudes a plurality of longitudinally-extending prongs. Such prongs contact the additional electrodes of the device.

The capacitor can comprise three concentric dielectric cylinders which form, along with the radial walls, outer and inner rings of passages, the surfaces of which are electroded. At least one of the end terminations can comprise a cup-shaped portion which protrudes into the end of the central cylinder. The prongs of that end termination extend into the outer ring of passages.

In another embodiment the capacitor comprises a single cylinder, the radial walls extending therefrom to the longtitudinal axis of the device. The prongs of the first end termination means protrude into every second passage. The electrodes in the remaining passages contact the second end termination means. The capacitor of this embodiment can include an outer electrode comprising a plurality of longitudinally extending segments, each of which is located radially outwardly from one of the passages. The first end termination means comprises a first plurality of prongs and a second plurality of prongs, one of which is azimuthally disposed between each pair of the first plurality of prongs. The second pluality of prongs extend longitudinally from which the first plurality of prongs extend. The second plurality of prongs contact those conductive segments that are disposed radially outwardly from passages that do not receive the first plurality of prongs.

The prongs of an end termination need not physically contact each electrode that is to be electrically connected thereto. Instead, a prong may physically contact a first electrode and be electrically connected to a second electrode by a conductive coating on the end of the device.

The method of the present invention involves the extrusion of a ceramic tube having an outer cylinder and a plurality of inwardly extending radial walls which, along with the cylinder, form a plurality of longitudinally extending passages. More specifically, the extrusion may comprise a plurality of concentric cylinders connected by the radial walls; it may comprise a single cylinder from which the radial walls extend to the longitudinal axis, or some combination of these. The extruded body is fired, and desired portions thereof including the passages are provided with conductive electrodes.

A first end termination having a plurality of prongs is affixed to one end of the capacitor in such a manner that the prongs thereof are inserted into at least some of the passages where they contact the electrodes therein. The second end termination is applied to the second end of the capacitor where it contacts the remaining electrodes.

The pronged end termination can be easily formed by stamping from sheet metal a central portion and a plurality of radially-extending fingers. The fingers are bent to an angle with respect to the central portion and are then inserted into the passage.

DESCRIPTION OF THE PREFERRED EMBODIMENTS

Figure 1:
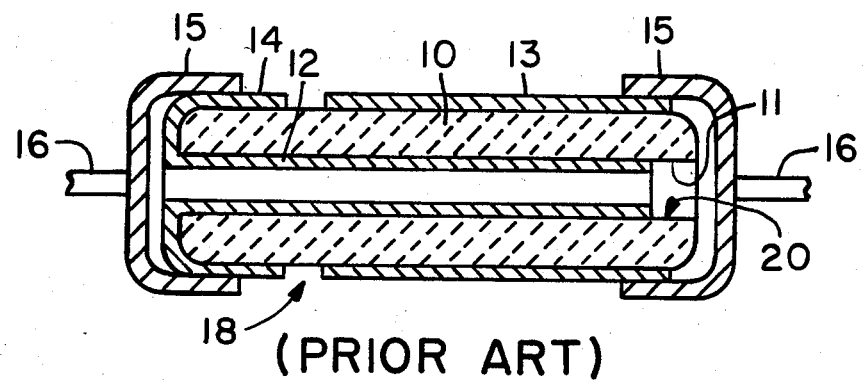
FIG. 1 is an axial cross-sectional view of a conventional tubular capacitor.

FIG. 1 illustrates a conventional tubular ceramic capacitor comprising a tube 10 of ceramic dielectric material having an aperture 11 therethrough. Tube 10 has an inner electrode 12 and an outer electrodes 13 and 14 thereon. Metal caps 15 are pressed onto the opposite ends of the coated ceramic tube in mechanical and electrical contact with the electrodes, and wire leads 16 may be electrically connected to caps 15 to electrically connect the capacitor to an external circuit. The extent to which outer electrode 14 extends along its respective end of the capacitor detracts from the capacitance of the unit.

Tube 10 is formed by extruding and then firing a suitable ceramic dielectric material. Suitable ceramic materials include, but are not limited to titanates or niobates of barium, strontium and lead and combinations thereof. The ceramic powder may contain a variety of minor additions to tailor properties to various capacitor specifications. Forming the slurry for extrusion involves adding a defloculating surface active agent and a viscosity controlling substance to the ceramic powder. The slurry is then extruded through a die. The extruded material is cut to the desired length, depending on metallizing needs; then it is dried in an oven and finally sintered using a cycle varying with the material. After firing, the fully sintered material is metallized and cut apart. Metallization can be accomplished by liquid impregnation of the pieces of the extruded, fired body. Several metallizing systems can be used, such as suspensions of colloidal silver or copper, electroless nickel and/or copper, and the like. Tube 10 may be initially metallized over the entire inner and outer surface thereof, gaps 18 and 20 thereafter being formed by removing a portion of the deposited metal layer by means such as grinding, etching, laser burning or the like.

Commercial tubular capacitors of the type illustrated in FIG. 1 typically employ ceramic tubes having a length in the range of 4–10 mm, an outer diameter in the range 3–5 mm and an inner diameter in the range 1.5–3.0 mm.

In accordance with the present invention volumetric efficiency is enhanced by creating within the ceramic body internal surfaces which are metallized to provide additional electrode area and electrically terminating the metallized surfaces in such a manner as to minimize reductions in capacitance. For example, the capacitor of FIG. 1 suffers a loss of capacitance since electrode 14 is electrically connected to electrode 12. Since the capacitor of the present invention does not need an electrode corresponding to electrode 14, the capacitance thereof is enhanced.

The exterior of the extruded body can have various cross-sectional shapes such as circular, elliptical, square, rectangular or the like. The cross-sectional shape may depend on the intended method of termination which may be axial, parallel lead (radial) or direct soldering of a leadless unit to a circuit board. For the sake of simplicity the embodiments to be described herein are assumed to have a circular cross-section, but it is to be understood that they can be adapted to any exterior shape. The internal cross-sectional shape is designed in such a manner as to provide additional internal capacitive area as well as structural reinforcement of the exterior shell. The two basic configurations are the coaxial cylinder type, wherein two or more coaxial cylinders are joined by radial walls or spokes, and the spoke type wherein spokes or radial walls extend radially from the center to an outer cylinder. Combinations of both configurations can also be used. For any specific cross-sectional configuration, the metallizing and the electrical termination means and/or the interconnection of metallized areas should be carried out in such a manner that maximum capacitance is obtained for the smallest volume of finished capacitor.

To form tubular shapes of the type described hereinbelow, the ceramic slurry is extruded through a die of the type described in British Pat. No. 1,524,388. Pertinent information concerning the extrusion of thin-walled structures may be found in U.S. Pat. No. 3,790,654. The extruded ceramic precursor may be cut to 10 to 30 cm. length for firing. The sintered rods can be metallized either in full length, or after being cut to the length of individual capacitors. If the metallized long pieces are cut to the proper length, the endfaces are free of metal, and therefore they separate electrically the interior and exterior metallized surfaces. Interconnection between some surfaces may have to be established by applying dots of metal paint in selected locations. For the case of fully metallized pieces of capacitor length, on the other hand, it is necessary to remove metal along circular or other patterns in order to separate the electrode areas to be charged at opposite polarity. It is also possible to metallize pieces of double length and to cut them afterwards in two. In this case all exterior and interior areas are connected on one end only. Metallizing methods and extrusion configurations are very interdependent. A further factor affecting the choice of these structural elements is the type of termination desired for the finished capacitor.

Concerning choice of configuration for the dielectric extrusion the following considerations can be made. Increase in volumetric efficiency by generation of internal surfaces is limited mainly by the thickness of all parts. Capacitance is maximized by minimizing thickness. The minimum thickness practically obtained by extrusion is, after firing, about 0.08 mm. Such a thickness may be used for the interior walls, but the exterior has to be thicker, at least 0.15 mm, because of strength. Moreover, certain dielectric materials can only be used at a desirable voltage rating if they are about 0.25 mm or thicker. In this case the whole structure, both interior and exterior walls, may have the same thickness. In the more general case, however, the interior surfaces are more important for capacitance, and therefore should be thin. The external envelope, which is more important for structural strength, can usually be thicker. Finally, the internal space can be utilized best if the ratio of internal diameter to the thickness of the interior walls is greater than 4.

A first embodiment of the invention is shown in FIGS. 2 through 5. This embodiment comprises coaxial cylinders 22 and 23 which are held in spaced relationship by longitudinally-extending radial walls or spokes 24. The wall thicknesses of the cylinders, particularly of the inner cylinders, can be reduced to about 25 to 60% of the thickness needed for the one cylinder unit of FIG. 1 because of the reinforcing effect of the spokes holding the coaxial cylinders together in the extruded body.

Electrodes 25, 26 and 27 can be formed by completely metallizing the surfaces of cylinders 22 and 23 and spokes 24 and thereafter removing unwanted portions 29 and 30 of the metallizing by sandblasting, grinding, laser burn-out, or the like.

Figure 2:
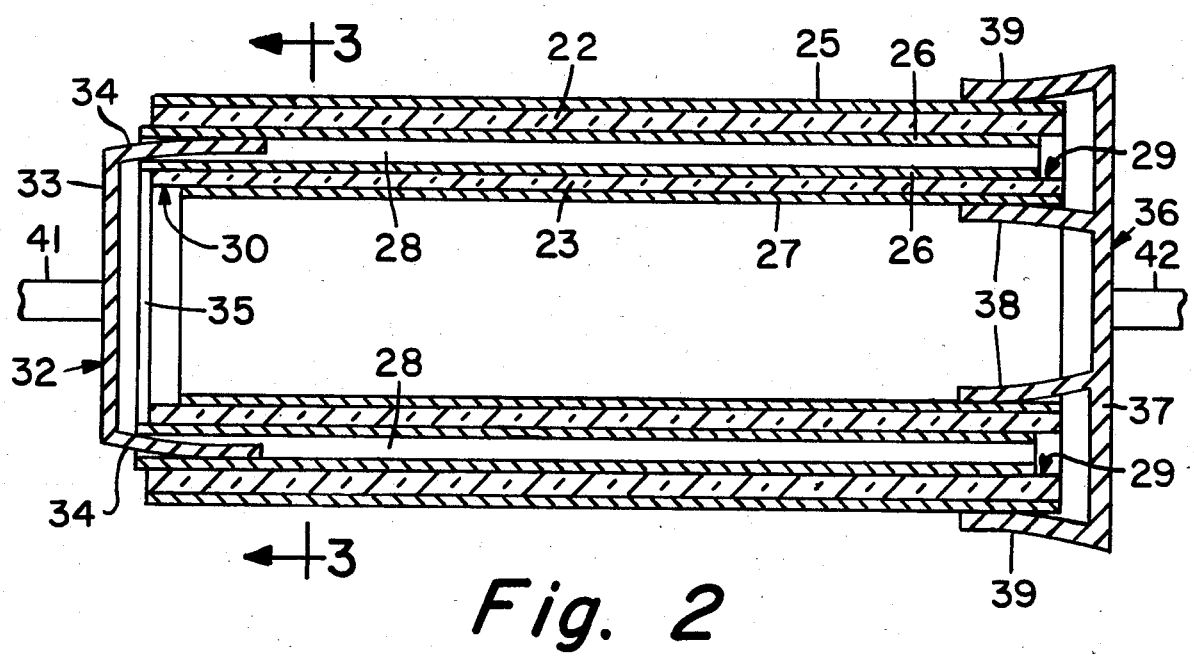
FIG. 2 is an axial cross-sectional view of a tubular capacitor constructed in accordance with this invention.
Figure 3:
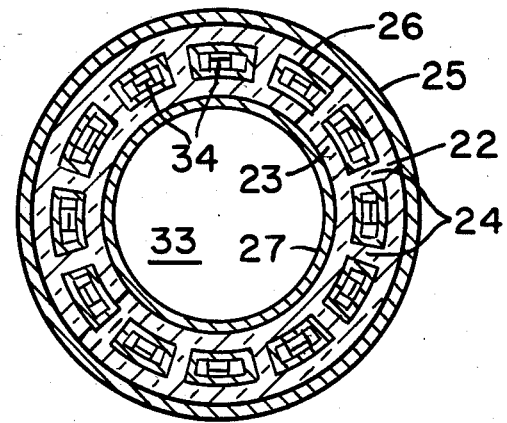
FIG. 3 is a cross-sectional view taken along lines 3—3 of FIG. 2.
Figure 4:
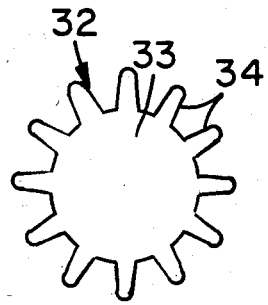
FIGS. 4 and 5 illustrate two end terminations that can be employed in the embodiment of FIG. 2.
Figure 5:
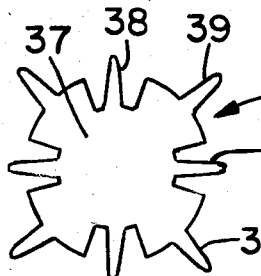

The end terminations, which are shown in smaller size in FIGS. 4 and 5, can be formed by stamping out from sheet metal the flat shapes shown in these figures and then bending and inserting the prongs into the proper locations of the tubular structure as shown in FIGS. 2 and 3. Termination 32 comprises a flat circular member 33 from which there extends a sufficient number of prongs 34 that one prong extends into each longitudinal passage 28. In a modification of this embodiment, the electrodes 26 in all of the passages 28 can be interconnected by metallic layer 35. In such a modification termination 32 need not have a prong 34 for each passage 28. An axially symmetrical end termination could have as few as two prongs, the central member being as narrow as the prongs, if desired. Termination 36 comprises a flat member 37. A plurality of prongs 38 extend from a peripheral portion of member 37 of relatively small radius, and a plurality of prongs 39 extend from a peripheral portion of member 37 of relatively large radius. Since prongs 38 and 39 merely contact continuous electrodes 27 and 25, respectively, any number of such prongs could be employed. Elasticity keeps the prongs in contact with the metallized surfaces against which they bear. Lead wires 41 and 42 are welded to termination members 33 and 37 prior to their application to the capacitor body. Suitable plastic or glass frit encapsulation can be applied to give mechanical stability to the terminations.

Figure 2A:
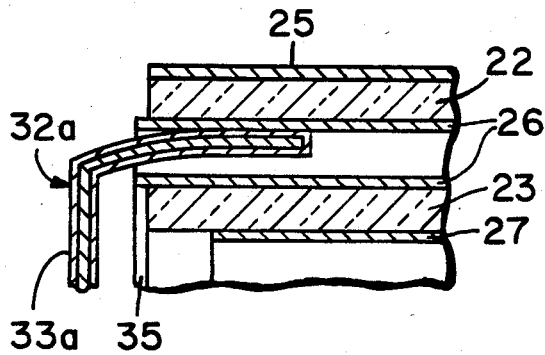
FIG. 2a is a fragmentary cross-sectional view of a modification of FIG. 2.

Additional mechanical strength may be obtained by providing termination members 33 with a coating 33a of conductive cement or a low melting point temperature alloy as shown in FIG. 2a. After the termination members are in place, the unit can be subjected to an elevated temperature to fuse the termination members to the electrodes. Whereas the entire termination member 33 is shown as being coated, only the prongs need be coated. Furthermore, the cement or alloy coating may be applied only to that surface of the prongs that contacts the electrodes.

Figure 6:
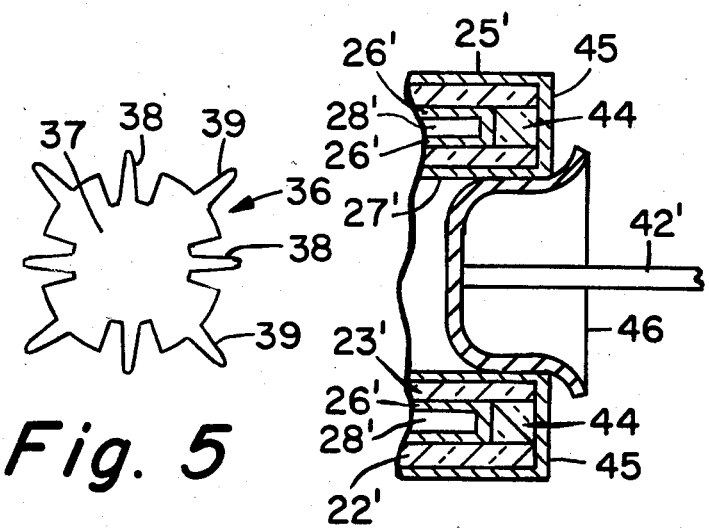
FIG. 6 is a partial axial cross-sectional view of a further embodiment of the invention.
Figure 7:
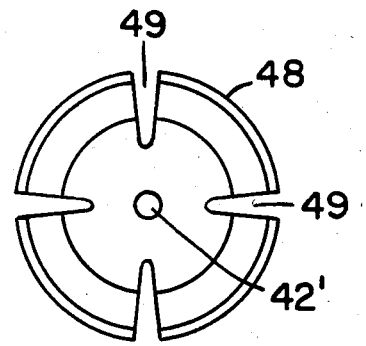
FIG. 7 shows a modified end termination for use in the embodiment of FIG. 6.

As shown in FIG. 6, wherein elements similar to those of FIG. 2 are designated with primed reference numerals, the tubular body can be preshaped before metallizing. Plugs 44, which fill the ends of passages 28', prevent electrode 26' from extending to the ends of cylinders 22' and 23'. Plugs 44 may consist of a viscous slurry that can be applied by a printing technique and thereafter fired. A metallic layer 45 on the ends of cylinders 22' and 23' and plug 44 electrically connects electrodes 25' and 27'. Since electrodes 25' and 27' are interconnected, a simple inverted cup-shaped termination 46 can be employed at that end of the capacitor. Termination 46 can be continuous, as shown in FIG. 6. However, an inverted cup-shaped termination 48 may contain a plurality of radial slots 49, as shown in FIG. 7, in order to exert less pressure against cylinder 23'.

Figure 8:
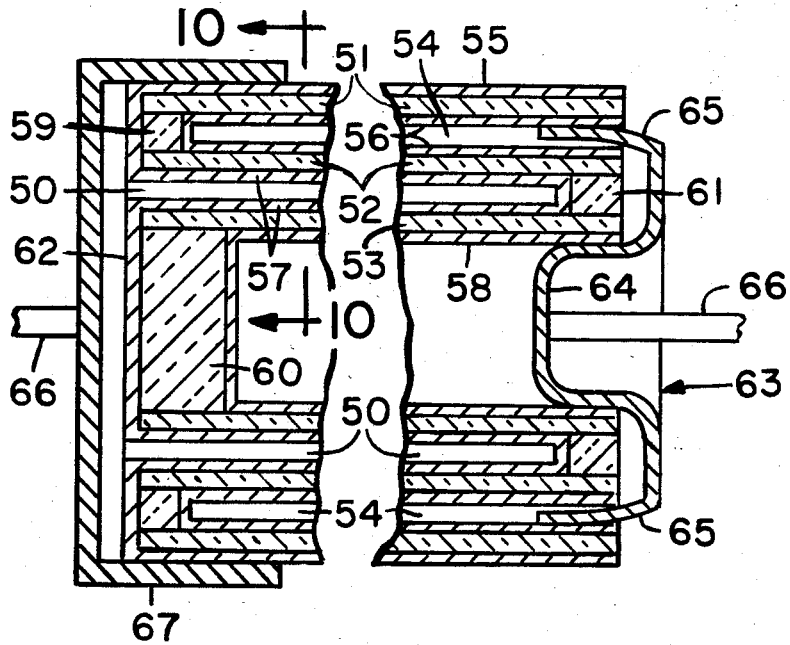
FIG. 8 is a cross-sectional view of another embodiment.
Figure 9:
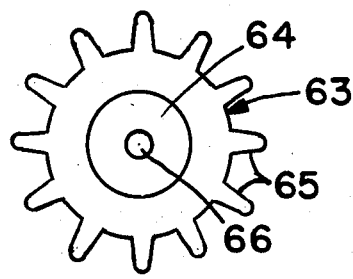
FIG. 9 is an end view of the end termination employed in the embodiment of FIG. 8.
Figure 10:
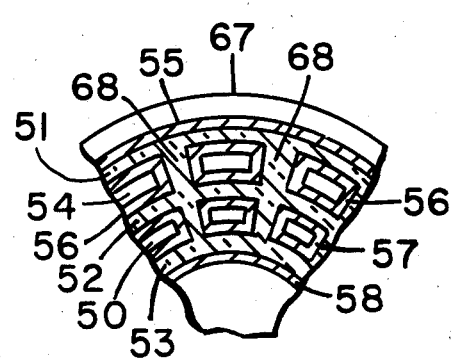
FIG. 10 is a cross-sectional view taken along lines 10—10 of FIG. 8.

In the embodiment shown in FIGS. 8 through 10 the tubular body comprises concentric cylinders 51, 52 and 53 which are interconnected by radial walls 68. Two rows of longitudinal passages 50 and 54 are formed between the cylinders and the radial walls. Electrode 55 is located on the outer surface of cylinder 51; electrodes 56 are located on the walls of passages 54; electrodes 57 are located on the walls of passages 50, and electrode 58 is located on the inner surface of cylinder 53. Plugs 59 prevent electrodes 56 from extending to the left end of the device and plug 60 prevents electrode 58 from extending to that end. Plugs 61 prevent electrodes 57 from extending to the right end of the device. The left end of the device has a conductive coating 62 which connects electrodes 55 and 57. The right end of the device is free from conductive coatings.

In the embodiment of FIG. 8 a combination cupped and pronged termination 63 may be employed. Termination 63 can be formed by stamping out a flat shape and then impressing therein a cup-shaped curvature as shown in FIG. 8. The cup-shaped portion 64 is inserted into the central aperture where it contacts electrode 58, and prongs 65 are inserted into longitudinal passages 54 where they contact electrodes 56.

The left end of the device can be provided with a conventional cup 67, since electrodes 55 and 57 are connected by coating 62. A cupped and pronged termination could be employed at the left end if plug 60 were not used. Electrode 58 would have to terminate a sufficient distance from the left end so that it would not contact the cup. The prongs would extend into passages 50 and contact electrodes 57. Alternatively, a pronged termination similar to termination 36 of FIGS. 2 and 5 could be employed to make contact with electrodes 55 and 57. This latter-mentioned method of termination would not require conductive end coating 62. The terminations may be provided with lead wires 66 and encapsulated and/or bonded to the electrodes as described above.

Figure 11:
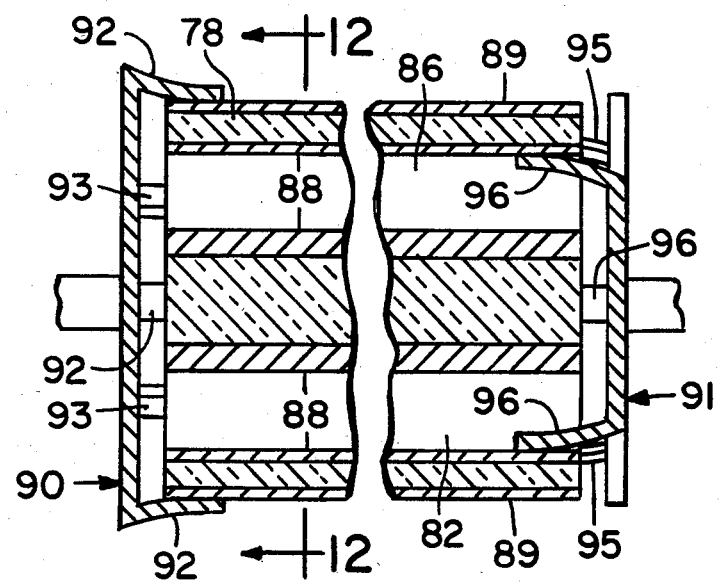
FIG. 11 is a cross-sectional view of yet another embodiment of the invention.
Figure 12:
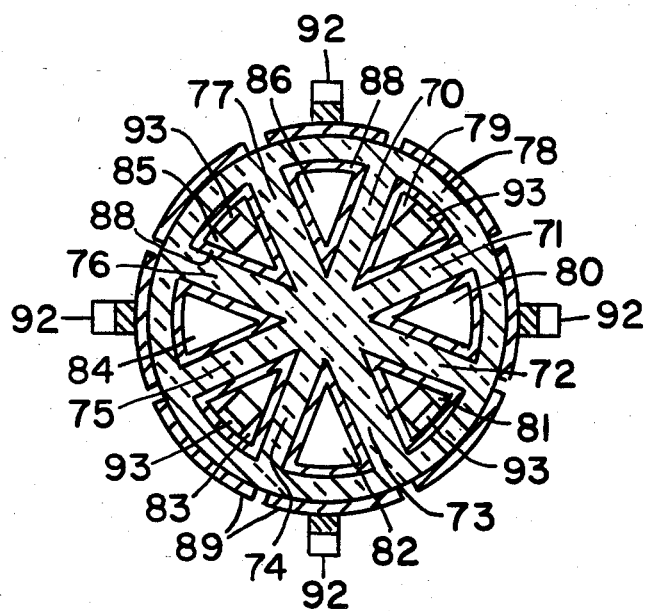
FIG. 12 is a cross-sectional view taken along lines 12—12 of FIG. 11.

In the embodiment shown in FIGS. 11 and 12 the main contribution to capacitance is from the radial walls 70 through 77 rather than from the wall of cylinder 78. Each adjacent pair of radial walls along with the respective section of cylinder 78 forms a longitudinal passage.

Passages 79 through 86 are thus formed. A conductive electrode 88 is deposited on the walls forming each passage. The outer electrode is divided into a plurality of segments 89 equal in number to the number of passages and aligned with the passages. End terminations 90 and 91 of the type shown in FIG. 5 are affixed to the ends of the device. Outer prongs 92 of termination 90 are connected to every second outer electrode segment 89. Inner prongs 93 of termination 90 are inserted into passages 79, 81, 83 and 85 which are located intermediate those passages with which outer prongs 92 are aligned. The prongs of termination 91 are rotated one passage with respect to those of termination 90. Thus, outer prongs 95 of termination 91 are in contact with those outer electrode segments 89 which are located radially outwardly from passages 79, 81, 83 and 85. Inner prongs 96 of termination 91 are inserted into passages 80, 82, 84 and 86 where they contact electrodes 88. Since the electrodes 88 of adjacent passages are connected to opposite end terminations, radial walls 70 through 77 contribute to the capacitance of the tubular device. Furthermore, since each outer electrode 89 is connected to an end termination different from that to which the electrode of the adjacent passage is connected, most of the outer cylinder 78 also contributes to the capacitance. The device of FIGS. 11 and 12 could be simplified at a slight cost in capacitance by eliminating outer electrode segments 89. Thus, prongs 92 and 95 could be eliminated, and four-pronged terminations of the type shown in FIG. 4 could be employed.

I claim:

1. A tubular capacitor comprising an outer dielectric cylinder having first and second ends, a plurality of radial dielectric walls extending inwardly from said outer cylinder, the spaces between said outer cylinder and said radial walls forming longitudinal passages, conductive electrodes on at least the walls that form said passages, and first and second end termination means respectively situated at said first and second ends of said cylinder, said first termination means comprising a base member from which there protrudes a first plurality of longitudinally-extending prongs, said first plurality of prongs extending into at least a portion of said passages and electrically contacting the electrodes therein, said second termination means contacting those of said electrodes that are not contacted by said first termination means.

2. A capacitor in accordance with claim 1 further comprising a second dielectric cylinder within said first cylinder, said radial walls extending between said cylinders, the spaces between said cylinders and said radial walls constituting said passages, additional conductive electrodes on the outer surface of said outer cylinder and on the inner surface of said inner cylinder, the prongs of said first electrical termination means connected to the conductive electrodes within all of said passages, said second termination means connected to said additional conductive electrodes.

3. A capacitor in accordance with claim 2 wherein said second termination means comprises a base member from which there protrudes a plurality of longitudinally-extending prongs, said prongs contacting said additional electrodes.

4. A capacitor in accordance with claim 1 wherein said radial walls extend inwardly to the longitudinal axis of said outer cylinder, the conductive electrodes in every second passage being connected to the prongs of said first termination means, the conductive electrodes in the remaining ones of said passages being connected to said second termination means.

5. A capacitor in accordance with claim 4 further comprising a plurality of spaced, conductive electrode segments extending longitudinally along the outer surface of said cylinder, one of said segments being located radially outwardly from each of said passages, said first end termination means comprising a second plurality of prongs that are azimuthally disposed between each of said first plurality of prongs, said second plurality of prongs extending longitudinally from said base member at a radius greater than that from which said first plurality of prongs extends, said second plurality of prongs contacting those conductive segments that are disposed radially outwardly from passages that do not receive said first plurality of prongs.

6. A capacitor in accordance with claim 1 further comprising a second dielectric cylinder within said outer cylinder and a third dielectric cylinder within said second cylinder, said radial walls extending between said cylinders, a first annular ring of said passages extending between said outer and second cylinders, a second annular ring of said passages extending between said second and third cylinders, said first termination means further comprising a cup-shaped member that protrudes into the end of said third cylinder, the prongs of said first termination means extending into the passages between said outer and second cylinders.

7. A capacitor in accordance with claim 1 further comprising a second dielectric cylinder within said first cylinder, said radial walls extending between said cylinders, additional conductive electrodes on the outer surface of said outer cylinder and the inner surface of said second cylinder, said second termination means comprising a cup-shaped member that protrudes into the end of said second cylinder.

8. A capacitor in accordance with claim 1 wherein certain ones of said electrodes are electrically connected by a conductive coating on an end of said capacitor.

9. A capacitor in accordance with claim 1 wherein at least that surface of said prongs that contacts said electrodes is provided with a coating that conductively bonds said prongs to their respective electrodes.

10. A method of making a tubular capacitor comprising the steps of extruding a ceramic tube having an outer cylinder and a plurality of radial walls which, along with said cylinder, form a plurality of longitudinally extending passages, firing said extruded tube, metallizing desired portions of the outer and inner surfaces of said cylinder and said radial walls, providing first and second end termination means, said first end termination means comprising a central portion and a plurality of longitudinally-extending prongs, inserting at least some of the prongs of said first end termination means into at least some of said passages from a first end of said capacitor, said prongs contacting the electrodes in said passages, and applying said second end termination means to the second end of said capacitor in such a manner that it electrically contacts those of said electrodes which are not contacted by said first end termination means.

11. A method in accordance with claim 10 wherein the step of providing said first end termination means comprises stamping from a sheet of metal a preform comprising a central portion and a plurality of radially-extending fingers and bending said fingers to form said prongs.

* * * * *